(12) United States Patent
Tripathi et al.

(10) Patent No.: US 11,500,945 B2
(45) Date of Patent: Nov. 15, 2022

(54) SYSTEM AND METHOD OF CRAWLING WIDE AREA COMPUTER NETWORK FOR RETRIEVING CONTEXTUAL INFORMATION

(71) Applicant: Innoplexus AG, Eschborn (DE)

(72) Inventors: Gaurav Tripathi, Pune (IN); Suyash Masugade, Satara (IN); Hitesh Chavhan, Thane (IN); Aman Rajput, Etah (IN)

(73) Assignee: Innoplexus AG, Eschborn (DE)

( * ) Notice: Subject to any disclaimer, the term of this patent is extended or adjusted under 35 U.S.C. 154(b) by 179 days.

(21) Appl. No.: 16/366,228

(22) Filed: Mar. 27, 2019

(65) Prior Publication Data
US 2020/0089712 A1    Mar. 19, 2020

(30) Foreign Application Priority Data
Mar. 27, 2018 (GB) ..................................... 1804921

(51) Int. Cl.
*G06F 16/951* (2019.01)
(52) U.S. Cl.
CPC ................................ *G06F 16/951* (2019.01)
(58) Field of Classification Search
None
See application file for complete search history.

(56) References Cited

U.S. PATENT DOCUMENTS

| | | | | |
|---|---|---|---|---|
| 7,769,742 B1 * | 8/2010 | Brawer | ................. | G06F 16/951 |
| | | | | 707/709 |
| 8,661,069 B1 * | 2/2014 | Cox | ..................... | G06F 16/951 |
| | | | | 707/826 |
| 9,800,517 B1 * | 10/2017 | Anderson | ............... | H04L 47/70 |
| 2002/0194211 A1 * | 12/2002 | Subramanian | ........ | G06F 16/972 |
| | | | | 715/200 |
| 2008/0270571 A1 * | 10/2008 | Walker | ................ | G06F 21/6209 |
| | | | | 709/218 |

(Continued)

OTHER PUBLICATIONS

Bhaginath et al., "Virtualized Dynamic URL Assignment Web Crawling Model", 2014 (Year: 2014).*

*Primary Examiner* — Dawaune A Conyers
(74) *Attorney, Agent, or Firm* — Ziegler IP Law Group, LLC

(57) ABSTRACT

A system and method for crawling a wide area computer network for retrieving contextual information. The system includes a data processing arrangement including a communication interface for accessing the wide area computer network and a web crawling module. The web crawling module is operable to receive an input file including plurality of Uniform Resource Identifiers (URIs) via a user interface, identify accessible URIs from the plurality of accessible URIs, obtain one or more features associated with accessible URIs, and execute an event for crawling the accessible URIs, the event includes creating resource cluster for executing the event, acquiring electronic record file to be executed by the resource cluster, and crawling the accessible URIs, furthermore, the web crawling module processes the extracted web content to identify contextual data. The system further includes a database arrangement communicably coupled to the data processing arrangement to aggregate contextual data therein.

13 Claims, 3 Drawing Sheets

(56) References Cited

U.S. PATENT DOCUMENTS

2009/0288099 A1* 11/2009 Rybak ................... G06F 16/951
                                                        719/313
2016/0328475 A1* 11/2016 Liao ...................... G06F 16/958
2020/0065857 A1*  2/2020 Lagi .................... G06F 16/9535

* cited by examiner

SYSTEM AND METHOD OF CRAWLING WIDE AREA COMPUTER NETWORK FOR RETRIEVING CONTEXTUAL INFORMATION

CROSS-REFERENCE TO RELATED APPLICATIONS

This application claims the benefit under 35 U.S.C. § 119(a) and 37 CFR § 1.55 to UK Patent Application No. GB1804921.3, filed on Mar. 27, 2018, the entire content of which is incorporated herein by reference.

TECHNICAL FIELD

The present disclosure relates generally to web crawling; and more specifically, to systems that crawls a wide area computer network for retrieving contextual information. Furthermore, the present disclosure relates to methods for crawling a wide area computer network for retrieving contextual information. Moreover, the present disclosure also relates to computer readable medium containing program instructions for execution on a computer system, which when executed by a computer, cause the computer to perform method steps of crawling a wide area computer network for retrieving contextual information.

BACKGROUND

In recent years, there has been tremendous increase in use of computing devices, such as personal computers, laptops, connected to a global network of millions of other computers, namely the World Wide Web. Furthermore, the computing devices (such as servers) are operable to store digital information, and allow access to digital information stored therein. Furthermore, in such set-up the computing devices are connected to other computers in the World Wide Web network and capable of accessing digital information therefrom. Moreover, with development of technology, accessing the digital information has been automated by introducing programs that are operable to access (crawl) the computers (such as servers storing websites, webpages and the likes) of the World Wide Web to download and upload digital information. The programs use Uniform Resource Identifier (URI) associated with the servers to download and upload digital information.

However, such conventional setups for crawling the World Wide Web includes a number of problems. Typically, in conventional crawling arrangements, a fixed infrastructure, including a large number of resources, is used for browsing the World Wide Web. Such conventional crawling arrangements have an inherent problem of not being able to scale the number of resources for accessing the World Wide Web depending upon requirement thereof. Therefore, such conventional crawling arrangements are only suited to access a fixed number of URIs. Furthermore, the conventional crawling arrangements can be time consuming as the conventional crawling arrangements crawl URIs irrespective of relevancy thereof. Additionally, at an instance of unexpected increase in number of URIs to be crawled, the conventional crawling arrangements get overloaded. Consequently, such overloading may lead to hardware failure, high maintenance and thereby increasing the operation cost. Moreover, the conventional crawling arrangements generate crawling output data in restricted data formats, therefore the output data needs to be further processed, cleaned and converted to required data format manually. Thus, the conventional crawling arrangements are non-optimized, time consuming and cumbersome to operate.

Therefore, in light of the foregoing discussion, there exists a need to overcome the aforementioned drawbacks associated with conventional crawling of the World Wide Web

SUMMARY

The present disclosure seeks to provide a system that crawls a wide area computer network for retrieving contextual information. The present disclosure also seeks to provide a method of crawling a wide area computer network for retrieving contextual information. The present disclosure also seeks to provide a computer readable medium, containing program instructions for execution on a computer system, which when executed by a computer, cause the computer to perform method steps of crawling a wide area computer network for retrieving contextual information. The present disclosure seeks to provide a solution to the existing problem of inefficient and time-consuming web crawling. Additionally, the present disclosure seeks to provide a solution to optimize efficiency and performance of hardware system that performs the aforementioned method. An aim of the present disclosure is to provide a solution that overcomes at least partially the problems encountered in prior art, and provide an optimized, faster and efficient method of web crawling and extracting relevant information from the web.

In one aspect, an embodiment of the present disclosure provides a system that crawls a wide area computer network for retrieving contextual information, wherein the system includes a computer system, wherein the system comprises:

a data processing arrangement comprising a communication interface for accessing the wide area computer network and a web crawling module, wherein the web crawling module is operable to:

receive an input file via a user interface provided by the data processing arrangement, wherein the input file includes a plurality of Uniform Resource Identifiers, wherein each of the plurality of Uniform Resource Identifiers points to a corresponding web location in the wide area computer network;

identify, from the plurality of Uniform Resource Identifiers, accessible Uniform Resource Identifiers based on one or more parameters associated with each of the plurality of Uniform Resource Identifiers;

obtain one or more features associated with the accessible Uniform Resource Identifiers; and execute an event for crawling the accessible Uniform Resource Identifiers to extract web content available in the corresponding web locations, wherein executing the event comprises:

creating at least one resource cluster for executing the event, wherein the at least one resource cluster comprises one or more resources acquired based on the one or more features associated with the accessible Uniform Resource Identifiers;

acquiring at least one electronic record file to be executed by the at least one resource cluster, wherein acquiring the at least one electronic record file is based on the one or more features associated with the accessible Uniform Resource Identifiers; and crawling the accessible Uniform Resource Identifiers using the at least one resource cluster; and process the extracted web content to identify contextual data, wherein the contextual data is organized into one or more data structure; and a database arrangement communicably coupled to the data processing arrangement via the communication interface, wherein the database arrangement is operable to aggregate the contextual data into one or more database arranged therein.

In another aspect, an embodiment of the present disclosure provides a method of crawling a wide area computer network for retrieving contextual information, wherein the method includes using a computer system, wherein the method comprises:

receiving an input file, wherein the input file includes a plurality of Uniform Resource Identifiers, wherein each of the plurality of Uniform Resource Identifiers points to a corresponding web location in the wide area computer network;

identifying, from the plurality of Uniform Resource Identifiers, accessible Uniform Resource Identifiers based on one or more parameters associated with each of the plurality of Uniform Resource Identifiers;

obtaining one or more features associated with the accessible Uniform Resource Identifiers;

executing an event for crawling the accessible Uniform Resource Identifiers to extract web content available in the corresponding web locations, wherein executing the event comprises:

creating at least one resource cluster for executing the event, wherein the at least one resource cluster comprises one or more resources acquired based on the one or more features associated with the accessible Uniform Resource Identifiers;

acquiring at least one electronic record file to be executed by the at least one resource cluster, wherein acquiring at least one electronic record file is based on the one or more features associated with the accessible Uniform Resource Identifiers; and crawling the accessible Uniform Resource Identifiers using the at least one resource cluster;

processing the extracted web content to identify contextual data, wherein the contextual data is organized into one or more data structure; and aggregating the contextual data.

In yet another aspect, an embodiment of the present disclosure provides a computer readable medium, containing program instructions for execution on a computer system, which when executed by a computer, cause the computer to perform method steps for identifying at least one nascent topic related to a subject matter, the method comprising the steps of:

receiving an input file, wherein the input file includes a plurality of Uniform Resource Identifiers, wherein each of the plurality of Uniform Resource Identifiers points to a corresponding web location in the wide area computer network;

identifying, from the plurality of Uniform Resource Identifiers, accessible Uniform Resource Identifiers based on one or more parameters associated with each of the plurality of accessible Uniform Resource Identifiers;

obtaining one or more features associated with the accessible Uniform Resource Identifiers;

executing an event for crawling the accessible Uniform Resource Identifiers to extract web content available in the corresponding web locations, wherein executing the event comprises:

creating at least one resource cluster for executing the event, wherein the at least one resource cluster comprises one or more resources acquired based on the one or more features associated with the accessible Uniform Resource Identifiers;

acquiring at least one electronic record file to be executed by the at least one resource cluster, wherein acquiring at least one electronic record file is based on the one or more features associated with the accessible Uniform Resource Identifiers; and crawling the accessible Uniform Resource Identifiers using the at least one resource cluster;

processing the extracted web content to identify contextual data, wherein the contextual data is organized into one or more data structure; and aggregating the contextual data.

Embodiments of the present disclosure substantially eliminate or at least partially address the aforementioned problems in the prior art, and enables an efficient and reliable method for performing web crawling.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
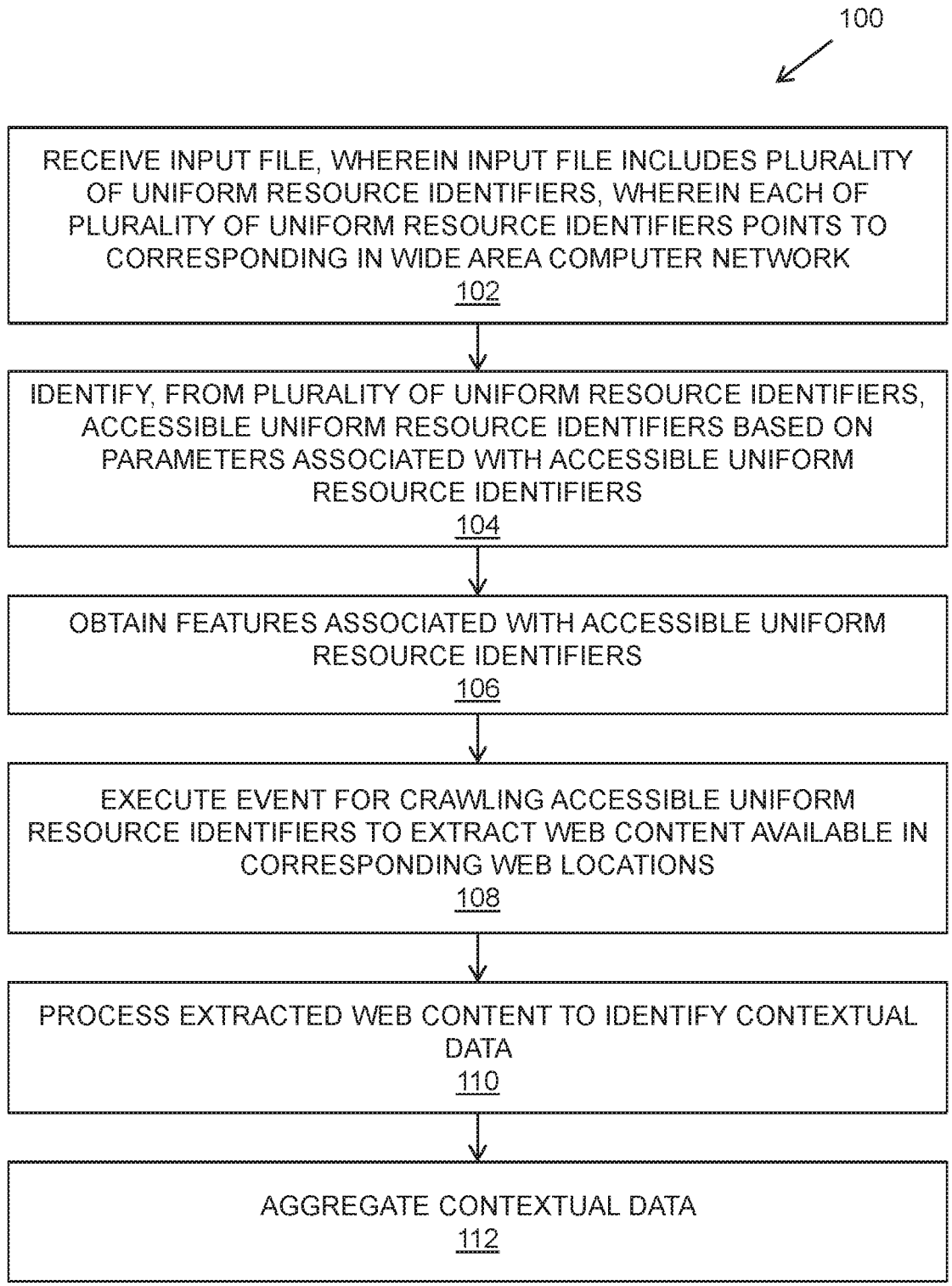
FIG. 1 is an illustration of steps of a method of crawling a wide area computer network for retrieving contextual information, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with crawling a wide area network and specifically to, determining resource allocation for crawling.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system that crawls a wide area computer network for retrieving contextual information, wherein the system includes a computer system, wherein the system comprises:
  a data processing arrangement comprising a communication interface for accessing the wide area computer network and a web crawling module, wherein the web crawling module is operable to:
    receive an input file via a user interface provided by the data processing arrangement, wherein the input file includes a plurality of Uniform Resource Identifiers, wherein each of the plurality of Uniform Resource Identifiers points to a corresponding web location in the wide area computer network;
    identify, from the plurality of Uniform Resource Identifiers, accessible Uniform Resource Identifiers based on one or more parameters associated with each of the plurality of Uniform Resource Identifiers;
    obtain one or more features associated with the accessible Uniform Resource Identifiers; and
    execute an event for crawling the accessible Uniform Resource Identifiers to extract web content available in the corresponding web locations, wherein executing the event comprises:
      creating at least one resource cluster for executing the event, wherein the at least one resource cluster comprises one or more resources acquired based on the one or more features associated with the accessible Uniform Resource Identifiers;
      acquiring at least one electronic record file to be executed by the at least one resource cluster, wherein acquiring the at least one electronic record file is based on the one or more features associated with the accessible Uniform Resource Identifiers; and
      crawling the accessible Uniform Resource Identifiers using the at least one resource cluster; and
    process the extracted web content to identify contextual data, wherein the contextual data is organized into one or more data structure; and
  a database arrangement communicably coupled to the data processing arrangement via the communication interface, wherein the database arrangement is operable to aggregate the contextual data into one or more database arranged therein.

In another aspect, an embodiment of the present disclosure provides a method of crawling a wide area computer network for retrieving contextual information, wherein the method includes using a computer system, wherein the method comprises:
  receiving an input file, wherein the input file includes a plurality of Uniform Resource Identifiers, wherein each of the plurality of Uniform Resource Identifiers points to a corresponding web location in the wide area computer network;
  identifying, from the plurality of Uniform Resource Identifiers, accessible Uniform Resource Identifiers based on one or more parameters associated with each of the plurality of Uniform Resource Identifiers;
  obtaining one or more features associated with the accessible Uniform Resource Identifiers;
  executing an event for crawling the accessible Uniform Resource Identifiers to extract web content available in the corresponding web locations, wherein executing the event comprises:
    creating at least one resource cluster for executing the event, wherein the at least one resource cluster comprises one or more resources acquired based on the one or more features associated with the accessible Uniform Resource Identifiers;
    acquiring at least one electronic record file to be executed by the at least one resource cluster, wherein acquiring at least one electronic record file is based on the one or more features associated with the accessible Uniform Resource Identifiers; and
    crawling the accessible Uniform Resource Identifiers using the at least one resource cluster;
  processing the extracted web content to identify contextual data, wherein the contextual data is organized into one or more data structure; and
  aggregating the contextual data.

The present disclosure provides the system and method for crawling a wide area computer network for retrieving contextual information. The system is operable to determine number of resources required for crawling the wide area computer network based on number of uniform resource identifiers (URIs) to be accessed. Furthermore, the system is capable to scale the number of resources based on requirement thereof, i.e. the number of URIs in the wide area computer network required to be accessed. Beneficially, the system is configured to optimize use of the resources (such as virtual machine). Additionally, the system is operable to determine number of electronic record files (comprising URIs to be crawled) to be executed on the resources to extract web content and further process the web content to identify contextual information from the extracted web content. Therefore, the system is configured to efficiently execute the crawling method, i.e. perform crawling in less amount of time. Furthermore, the system is configured to provide the contextual data to be stored in different databases and in different formats. Beneficially, the contextual data to be can be readily used for different operation with further processing. The system is an automated system that is capable of reducing human intervention for optimized crawling of the wide area computer network. The system provides an effective seamless, portable and modular means for crawling of URIs in the Wold Wide Web.

The computer system relates to at least one computing unit comprising a central storage system, processing units and various peripheral devices. Optionally, the computer system relates to an arrangement of interconnected computing units, wherein each computing unit in the computer system operates independently and may communicate with other external devices and other computing units in the computer system.

The term "system that crawls" is used interchangeably with the term "system for crawling", wherever appropriate i.e. whenever one such term is used it also encompasses the other term. According to the present disclosure, the system for crawling the wide area computer network for retrieving contextual information relates to an arrangement of modules and/or units that include programmable and/or non-programmable components. The programmable and/or non-programmable components are configured to identify, extract, process and provide a set of data that describes information extracted from the wide area computer network.

Throughout the present disclosure, the term "wide area computer network" relates to (i) a distributed collection of interlinked, user-viewable hypertext documents (commonly referred to as Web documents or Web pages) stored in computing devices that are accessible via the Internet®, and (ii) client and server software components which provide user, access to such documents stored in computing devices using standardized Internet® protocols. Furthermore, a person skilled in the art will appreciate that the term "Internet®" relates to any collection of networks using standard protocols. For example, the term "Internet®" includes a collection of interconnected (public and/or private) networks that are linked together by a set of standard protocols (such as TCP/IP, HTTP, and FTP) to form a global, distributed network. Currently, the primary standard protocol for allowing applications to locate and acquire web documents is HTTP, and the Web pages are encoded using HTML. Additionally, the term Internet "Internet®" is also intended to encompass variations that may be made in the future, including changes and additions to existing standard protocols or integration with other media (e.g., television, radio, and the likes). Optionally, the wide area computer network refers to global network of millions of computers encompassing future mark-up languages and transport protocols that can be used in place of (or in addition to) HTML and HTTP for communication.

Throughout the present disclosure, the term "crawling" relates to a process of browsing a computing arrangement in a methodical and/or automated manner to scrape data and analyse the scraped data. The computing arrangement encompasses a wide area computer network (such as a World Wide Web), a heterogeneous repository, or document management systems. Furthermore, the data scraped is the data available in documents (webpage) present in the aforesaid global network, repository or system. Additionally, crawling can include one or more specification associated with data to be crawled, including how, when, and other parameters for controlling (namely, affecting) the process of crawling. Specifically, crawling relates to browsing the wide area computer network to scrape data from webpages hosted by computing devices included in the wide area computer network. The data scraped from the wide area computer network is organized to form the contextual information.

Throughout the present disclosure, the term "contextual information" used herein relates to information (namely, digital data) having a direct or indirect relationship with requirement of information by a user. The contextual information generated from organizing crawled data is based on one or more specification of crawling requirements. In an example, the crawling of the World Wide Web may be performed for a specific project (such as research of clinical trials associated with a painkiller drug). In such instance, the data fetched from the World Wide Web may be related to the specific project and subsequently, the data can be organized (such as processed, structured) to extract information related to the specific project.

The system comprises the data processing arrangement. Throughout the present disclosure, the term "data processing arrangement" relates to a computational element that is operable to process and respond to instructions for crawling the wide area computer network. The data processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit for executing the instructions of crawling. Furthermore, the data processing arrangement includes one or more individual processors, processing devices and various elements of a computer system associated with a processing device that may be shared by other processing devices. Additionally, one or more individual processors, processing devices, and elements are arranged in various architectures for responding to and processing the instructions that drive the system for retrieving contextual information.

The data processing arrangement comprises a communication interface for accessing the wide area computer network. Throughout the present disclosure, the term "communication interface" relates to an arrangement of interconnected programmable and/or non-programmable components in the data processing arrangement that are configured to facilitate data communication between the data processing arrangement and the wide area computer network. The data communication refers to accessing user-viewable hypertext documents stored in computing devices of the wide area computer network. A data connection for accessing the wide area computer network that is facilitated by the communication interface is provided using Wi-Fi, Universal Mobile Telecommunications System (UMTS), Ethernet, Low-Power Wide-Area Network (LPWAN), Satellite or other digital cellular technology. Furthermore, the communication interface includes, but is not limited to, hybrid peer-to-peer network, Local Area Network (LAN), Radio Access Network (RAN), Metropolitan Area Network (MAN), Wide Area Network (WAN), Low Powered Wide Area Network (LPWAN), and the likes. Optionally, the communication interface is a high-speed data communication channel.

The data processing arrangement comprises the web crawling module. Throughout the present disclosure, the term "web crawling module" used herein relates to a computational unit that is operable to respond to and process instructions for carrying out crawling of the wide area computer network (such as World Wide Web). The web crawling module includes logics and algorithms embodied in the hardware components of the data processing arrangement, the system for retrieving contextual information. The web crawling module can be configured to access or acquire the logics and algorithms from an independent repository which includes one or more documents that embodies scripts, chippers, codes, and the likes, for crawling and subsequently processing the crawled data. These logics and algorithms are compiled and linked into an executable program, installed in a dynamic link library, or written in an interpreted programming language such as, BASIC, Perl, or Python. Optionally, the executable program is configured to perform a specific task, and more preferably refers to a computer program that is configured to automate a computing task (such as the web crawling and/or processing the data acquired from web crawling) that would otherwise be performed manually. In an example, the executable program is a bot (or spider) that is configured to autonomously browse the wide area computer network to extract content (such as web content). In such an example, the bot and/or spider may be hosted on a computing device (such as a computer, a laptop, a smartphone and the like).

Optionally, the web crawling module is implemented in a distributed architecture. In a scenario, wherein the web crawling module is implemented in the distributed architecture, the programs (such as the bots and/or spiders) for browsing the wide area computer network, are configured to be hosted on one or more computing hardware that are spatially separated from each other. Optionally, the web crawling module can be configured to employ one or more third party service (such as Infrastructure as a service of a third-party cloud computing service) for executing the logics and algorithms accessed or acquired from the independent repository. It will be appreciated that executing the logics and algorithms by employing one or more third party service includes performing the aforementioned steps such as forming the executable program and the likes.

The web crawling module is operable to receive an input file via a user interface provided by the data processing arrangement. Throughout the present disclosure, the term "user interface" used herein relates to a structured set of graphical elements rendered on a display screen. It will be appreciated that display screen is a screen associated and included in the data processing arrangement. The user interface (UI) rendered on the display screen is generated by any collection or set of instructions executable by an associated digital system (such as the data processing arrangement). Optionally, the user interface (UI) is operable to receive input and convey graphical and/or textual information. Optionally, the user interface (UI) used herein is a graphical user interface (GUI) or a command prompt. The term user interface (UI) elements refer to visual objects that have a size and a position in the user interface (UI). Optionally, the user interface elements are visible, though there may be times when a user interface element is hidden. A user interface control is considered to be one of the user interface elements. Additionally, text blocks, labels, text boxes, list boxes, input boxes, lines, image windows, dialog boxes, frames, panels, menus, buttons, icons, etc. are examples of user interface elements. In addition to size and position, a user interface element may have other properties, such as a margin, spacing, and the like.

The user interface enables uploading the input file via the user interface elements such as an input box, for receiving the input file. In an example, the input file may be selected by uploading or dragged and dropped in an input box and subsequently the web crawling module is operable to receive the input file. Throughout the present disclosure, the term "input file" used herein relates to a collection of electronic data or information stored and/or transmitted using a common identifier (such as a file name). The input file can refer to at least one variable that is substituted dynamically at run time by operation of a physical or virtual computing resource (such as computer system or a virtual machine VM). The electronic data or information describes parameters on which a computing task (such as crawling) is based. Optionally, the computing task is a job for finding documents and/or information from one or more data storing media of the wide area computer network that are of relevance to the input file. Additionally, electronic data for the computing task as specified by the document can also include a program to be executed as a part of the computing task. Optionally, types of input files include data files, text files, program files, directory files, word processing files, image files, video files, spreadsheet files, and the like. Additionally, the input file can be identified (or named) by a sequence of one or more characters.

The input file includes a plurality of Uniform Resource Identifiers. The collection of electronic data or information stored and/or transmitted using the input file is the plurality of Uniform Resource Identifiers. Throughout the present disclosure, the term "Uniform Resource Identifiers" (referred to, herein later as "URIs") relates to any electronic object that identifies a resource or address (namely, location) on a network and that includes information for locating the resource. For example, the URIs may act as references to web pages on the World Wide Web. In an example, the URI is a Uniform Resource Locator (referred to, herein later as "URL"). Therefore, although the exemplary embodiments are described hereinafter with respect to URLs, a scope of claimed subject-matter is not so limited, and one or more of the described examples may be utilized in connection with the URI. In another example, the URI may include a uniform resource name (URN) and a URL. Optionally, the URI may be provided as a hyperlink, a DNS (Domain Name System) address and the like. The term "hyperlink" relates to a reference that points to a resource available via a communication network and, when selected by a bot (such as computer program for web crawling), automatically navigates an application to the resource. In this regard, the hyperlink can include hypertext.

In the present disclosure, each of the plurality of Uniform Resource Identifiers points to a corresponding web location in the wide area computer network. Throughout the present disclosure, the term "web location" used herein relates to web site, web page, or other items of interest accessible on the World Wide Web adapted to serve web content using any internetworking protocols, and is not intended to be limited to content uploaded or downloaded via the Internet® or the Hyper Text Transfer Protocol (HTTP). Furthermore, each of the plurality of URIs relates to a specific context, i.e. each of the URI in the input file relates to a specific circumstance that forms setting for an event, statement, or idea. For example, each of the plurality of URIs included in an exemplary input file "A" may direct crawling of web locations related to specific idea such as, top five people in field of Biotech, nascent topics in the field of cancer treatment and the likes. The web locations pointed to, by each of the plurality of URIs includes digital content related to a specific context. In an example, the digital data may include text, image, hyperlinks and the like.

The web crawling module is operable to identify, from the plurality of Uniform Resource Identifiers, accessible Uniform Resource Identifiers based on one or more parameters associated with each of the plurality of Uniform Resource Identifiers. The web crawling module is capable of determining accessible Uniform Resource Identifiers (URIs) from the plurality of Uniform Resource Identifiers. The accessible URIs corresponds to web location in the wide area computer network that is to be crawled by the web crawling module. Alternatively, the accessible URIs are resources identifiers that were included in the plurality of URIs provided in the input file received via the user interface, but had not been crawled by the web crawling module.

Optionally, the data processing arrangement further includes a data storage unit, wherein the data storage unit is operable to store the one or more parameters associated with crawled Uniform Resource Identifiers (URIs). Throughout the present disclosure, the term "data storage unit" used herein relates to a physical and/or logical entity that can store data that describes parameters of the crawling process of a crawled URI. It will be appreciated that the crawled URI corresponds to web location in the wide area computer network that has to be crawled by a third party (such as a data brokerage vendor that provides crawling information of web locations) or the web crawling module. Optionally, the data storage unit can accumulate the metadata in the form of a database, a table, a file, a list, a queue, a heap, a memory, a register, and the likes. Additionally, the data storage unit can reside in one logical and/or physical entity and/or may be distributed between two or more logical and/or physical entities. Optionally, the data storage unit can be periodically updated with the data describing attributes of the crawling process of a URI. Optionally, the one or more parameters associated with the crawled Uniform Resource Identifiers comprise at least one of: name, status, time-stamp, and project associated with each of Uniform Resource Identifiers. In another example, the data storage unit may include two crawled URIs namely URI X and URI Y. In such example, a name associated with the URI X may be "www.h0oc.in", a status associated with the URI X may be successful, a time-stamp associated with the URI X may be 8 pm on Dec. 12, 2012, and a project associated with the URI X may be research. Furthermore, a name associated with the URI Y may be "www.ao12i.in", a status associated with the URI Y may be failed, a time-stamp associated with the URI Y may be 8 pm on Dec. 12, 2012, and a project associated with the URI Y may be research.

Optionally, identifying the accessible Uniform Resource Identifiers further includes fetching the one or more parameters associated with the crawled Uniform Resource Identifiers from the data storage unit. The web crawling module is configured to access the data storage unit to acquire the one or more parameters associated with each of the plurality of URIs. For example, the one or more parameters associated with each of the plurality of URIs may include, name of the URI, a time of crawling the URI, a date of crawling the URI, a project for which the URI was crawled. Subsequently, the one or more parameters associated with each of the plurality of URIs acquired from the data storage unit is to compare with the plurality of Uniform Resource Identifiers provided in the input file. Optionally, the one or more parameters associated with each of the plurality of Uniform Resource Identifiers comprise at least one of: name, status, time-stamp, and project associated with each Uniform Resource Identifiers.

The web crawling module is operable to obtain one or more features associated with the Uniform Resource Identifiers. The web crawling module includes one or more algorithms for determining the one or more features of the Uniform Resource Identifiers. In an example, the one or more algorithms for determining the one or more features can employ tf-idf (term frequency-inverse document frequency) weighting value (namely, a notion of importance) of a URI. In an example, the one or more algorithms may be artificial intelligence algorithms to determine the relevance of each of the plurality of Uniform Resource Identifiers. In such example, artificial intelligence algorithms may involve a decision tree or a decision network, defining decision states concerning whether or not a URI is relevant. Furthermore, a type of each of the plurality of URIs is identified.

For example, the type of URI may include static URL, dynamic URL, directory URL and the like. In another example, the type of URI may include identifying the category of the domain name associated with the accessible URI. Beneficially, the type can be used to determine one or more operation that can be performed in the system. Optionally, the one or more features associated with each of the one or more accessible Uniform Resource Identifiers comprises traffic associated with the accessible Uniform Resource Identifiers. The traffic associated with the accessible Uniform Resource Identifiers relates to the amount of data that is being produced by the Uniform Resource Identifiers. In an example, a URI may be related to a website that is an online pharmacy service; therefore, the website may incur a large number of hits as it may be accessed by large number of user (people). Therefore, the amount of traffic incurred by the URI can be large, subsequently, a large amount of data can be generated due to inputs provided by one or more visitors accessing the website simultaneously.

The web crawling module is operable to execute an event for crawling the accessible Uniform Resource Identifiers to extract web content available in the corresponding web locations. Throughout the present disclosure, the term "event" used herein relates to any computing event or occurrence triggered from one or more computing policies associated with hardware, firmware, and/or software included in the system. Therefore, the event of crawling the accessible Uniform Resource Identifiers is a computing event (namely, a job) that is triggered by the web crawling module in order to extract web content available from the corresponding web locations. Optionally, the event of crawling includes one or more status to describe the condition of the event of crawling. The one or more status to describe the condition of the event of crawling is ongoing or completed. The ongoing status describes that the web crawling module is executing the event, i.e. the web crawling module is accessing the accessible Uniform Resource Identifiers. Subsequently, in an instance wherein the web crawling module has competed accessing the accessible Uniform Resource Identifiers, the status to describe the condition of the event of crawling would be completed. Throughout the present disclosure, the term "web content" relates to a type or arrangement of information available over the World Wide Web, accessible via a network (such as the Internet®). The web content relates to data associated with the webpage accessed by the programmable and/or non-programmable components of the system (such as the web crawling module) whilst browsing the World Wide Web using web addresses (such as the accessible URIs) corresponding to web locations. Furthermore, the type of information broadly refers to one or more documents, files, scripts, codes, executable programs, web pages or any other digital data that can be transmitted via the Internet®. Optionally, the web content includes various web-based contents, such as, HTML content, included in the webpage.

The execution of the event comprises creating at least one resource cluster for executing the event, wherein the at least one resource cluster comprises one or more resources acquired based on the one or more features associated with the accessible Uniform Resource Identifiers. Throughout the present disclosure, the term "resource" used herein relates to any hardware, software, and data elements of the system. Optionally, the one or more resources are computing units. The one or more resources, as used in this description, includes both physical and virtual resources. The physical resource can include hardware such as, for example, mainframes, servers, routers, switches, disk arrays, workstations, desktop computing devices, tablet computing devices, palmtop computing devices, communication devices, and the like. Furthermore, the virtual resources include software and data elements such as, for example, services, native and virtualized software applications, computer files, databases, and the like. Optionally, the virtual resource can be a virtual machine service that is availed by the web crawling module from a third-party service for executing the event of crawling the accessible Uniform Resource Identifiers. Therefore, the term "resource cluster" used herein relates to a cluster or collection of resources combined together to execute the event for crawling the accessible Uniform Resource Identifiers, and subsequently extract and process the web content available in the corresponding web locations.

The clustering of the one or more resources is done based on the one or more features associated with the accessible Uniform Resource Identifiers. The web crawling module is operable to use one or more logic or algorithms to analyse the one or more features associated with the accessible Uniform Resource Identifiers. For example, the accessible Uniform Resource Identifiers to be crawled by the web crawling module may include ten websites that are capable to incurring large amount traffic (such as 100 hits in one minute). In such example, the one or more logic or algorithms included in the web crawling module may be operable to determine that hundred resources will be required to execute the event of crawling. In another example, the accessible Uniform Resource Identifiers to be crawled by the web crawling module may include five websites that are capable of incurring large amount of traffic (such as 100 hits in one minute). In such example, the one or more logic or algorithms included in the web crawling module may be operable to determine that fifty resources will be required to execute the event of crawling. Therefore, the one or more logic or algorithms in the web crawling module determines the number of resources to be acquired to form the at least one resource cluster based on the one or more features associated with the accessible Uniform Resource Identifiers.

Optionally, the web crawling module is configured to determine the availability of a set of resources, for executing the event generated by the web crawling module, for crawling the accessible Uniform Resource Identifiers and to extract web content available in the corresponding web locations. More optionally, the one or more logic or algorithms used by the web crawling module to analyse the one or more features can be used to determine the availability of a set of resources. Optionally, the web crawling module can generate one or more event for crawling the accessible Uniform Resource Identifiers identified by the web crawling module. Optionally, the web crawling module is operable to maintain a set of performance metrics in a scenario wherein the one or more resources in the at least one resource cluster are virtual resource availed from a third-party service. Optionally, the set of performance metrics can include service attributes for example, a memory attribute, a Quality of Service (QOS) attribute, a network computing speed attribute and a delay penalty attribute. Optionally, the set of performance metrics can include a resource steerability attribute for each of the one or more resources. The resource steerability attribute facilitates the optimal usage of resources in the at least one resource cluster while executing the event.

The execution of the event comprises acquiring at least one electronic record file to be executed by the at least one resource cluster, wherein acquiring the at least one electronic record file is based on the one or more features associated with the accessible Uniform Resource Identifiers. Throughout the present disclosure, the term "electronic record file" used herein relates to a document that includes one or more program and logic that can direct an application or comprise a utility application for executing a program and/or an event. The at least one electronic record file comprises one or more sets of instructions. The instructions include steps of executing the event of crawling the accessible Uniform Resource Identifiers to extract web content available therein. Optionally, the one or more sets of instructions are operable to perform an activity of extracting web content from the web location in the wide area computer network. The one or more sets of instructions are configured to browse the wide area computer network (such as the World Wide Web) for extracting web content from the web location. The one or more sets of instructions are configured to access the accessible Uniform Resource Identifiers for browsing the wide area computer network. Optionally, each of the one or more sets of instructions is a computing algorithm. Optionally, the computing algorithm can be implemented as bots and/or spiders for extracting web content from the accessible Uniform Resource Identifiers. Optionally, the computing algorithm can be implemented as bots for processing the extracted web content and processing the web content from the accessible Uniform Resource Identifiers. Optionally, the computing algorithm is configured to automate a computing task (such as extracting and/or processing the web content) that would otherwise be performed manually. In an example, the executable program is a bot (or spider) that is configured to autonomously browse the web to extract web-content and process the extracted web content.

Optionally, acquiring at least one electronic record file further comprises fetching the at least one electronic record from an electronic record file repository. Throughout the present disclosure, the term "electronic record file repository" used herein relates to any device or combination of devices capable of storing, accessing and retrieving data, which may include any combination and number of data servers, databases, data storage devices and data storage media, in any standard, distributed or clustered environment. The data repository is configured to store and provide access to the at least one electronic record file. Optionally, the data repository is configured to store one or more electronic record file that can be acquired to perform more than one process, such as forming a resource cluster, extracting web content, processing web content, identifying contextual data from the extracted web content. The electronic record file repository is communicably coupled to the data processing arrangement. The web crawling module included in the data processing arrangement is operable to fetch the at least one electronic record file from the electronic record file repository via the communication interface. In an example, the data processing arrangement is operable to wirelessly acquire at least one electronic record file from the electronic record file repository.

The web crawling module is operable to acquire the at least one electronic record file based on the one or more features associated with the accessible Uniform Resource Identifiers. The web crawling module is operable to fetch the at least one electronic record file from the electronic record file repository based on the one or more features associated with the accessible Uniform Resource Identifiers. The web crawling module is operable to use one or more logic or algorithms to analyse the one or more features associated with the accessible Uniform Resource Identifiers for determining the number of electronic record files required for executing the event for crawling the accessible Uniform Resource Identifiers. For example, the accessible Uniform Resource Identifiers to be crawled by the web crawling module may include ten websites that are capable to incur large amount of traffic (such as 100 hits in one minute). In such example, the one or more logic or algorithms included in the web crawling module may be operable to determine that fifty electronic record files will be required to execute the event for crawling. In another example, the accessible Uniform Resource Identifiers to be crawled by the web crawling module may include five websites that are capable to incurring large amount traffic (such as 100 hits in one minute). In such example, the one or more logic or algorithms included in the web crawling module may be operable to determine that twenty-five electronic record file will be required to execute the event for crawling. Therefore, the one or more logic or algorithms in the web crawling module determines the number of electronic record file to be fetched for executing the event of crawling the accessible Uniform Resource Identifiers. Optionally, the one or more resources (the computing unit) are operable to execute the one or more sets of instructions included in the at least one electronic record file. Optionally, the at least one electronic record file fetched from the electronic record file repository is provided to the one or more resources for execution. Optionally, the web crawling module is configured to determine a number of electronic record file to be executed on a resource, based on a processing specification associated to the resource.

The execution of the event comprises crawling the accessible Uniform Resource Identifiers using the at least one resource cluster. The at least one resource cluster is operable to execute the at least one electronic record to crawl the accessible Uniform Resource Identifiers. Specifically, the at least one resource of the at least one resource cluster is a computing unit configured to execute the at least one electronic record file that includes one or more sets of instructions (i.e. one or more computing algorithm) to crawl the accessible Uniform Resource Identifiers that were identified from the plurality of Uniform Resource Identifiers included in the input file. Furthermore, crawling the accessible Uniform Resource Identifiers includes extracting web content available in the corresponding web locations. Additionally, the web crawling module is configured to process the extracted web content for retrieving the contextual information from the extracted web content.

Optionally, the execution of the event further comprises terminating the event for crawling, wherein terminating the event is based on a status of the event. The web crawling module is operable to terminate the event of crawling upon determining if the accessible Uniform Resource Identifiers has been accessed and if the web content from the corresponding web locations has been fetched. Optionally, the web crawling module uses the one or more logic and/or algorithms to determine if the accessible Uniform Resource Identifiers has been accessed. In such instance, if the web crawling module may determine the status of the event to be completed, then the web crawling module terminates the event.

The web crawling module is operable to process the extracted web content to identify contextual data. The contextual data refers to a data or an information that describes a character of the data filtered from the extracted web content. The contextual data is a form of data that is organized in a manner based on the input provided via the user interface. For example, the input provided via the user interface may be for researching a painkiller drug. In such instance, the web crawling module may browse (crawl) the URIs of the World Wide Web to extract web content related to painkiller drug. Furthermore, in such instance, the extracted web content related to the painkiller drug may be processed to identify terms, phrases, snippet of texts and the likes, related to the painkiller drug. Optionally, the web crawling module is operable to processing the extracted web content using the at least one electronic record file comprising the one or more sets of instructions. Optionally, the one or more sets of instructions are operable to perform an activity of processing the extracted web content to identify contextual data. The processing of the extracted web content to identify contextual data includes analysing the extracted web content. Furthermore, analysing the extracted web content includes one or more processes. Optionally, the analysis of the extracted web content can include identifying the contextual data that further includes snippet of texts, phrases, terms, a comment of a user of a product and the likes. Furthermore, the identifying of the contextual data in the extracted web content can be performed by one or more algorithms and/or methods, such as tokenization, stemming, and the likes. Optionally, the web crawling module is operable to access one or more external linguistic corpus for acquiring one or more phrases and terms that are similar to the identified relevant phrases and terms. For example, one or more external linguistic corpus may be Wordnet®, Sentiwordnet® and the like. The contextual data is organized into one or more data structure. Throughout the present disclosure, the term "data structure" relates to a way of organizing data (such as the contextual data) in a predetermined fashion. Specifically, the contextual data is organized in a data structure that is acceptable by a data storage arrangement such as a database, i.e. the data in the identified contextual data is organized in one or more specific data structure suitable for a corresponding database.

Optionally, that processing the extracted web content to identify the contextual data comprises generating an additional data associated with the each of the one or more accessible Uniform Resource Identifiers. Optionally, the additional data associated with the each of the one or more accessible Uniform Resource Identifiers relates to metadata associated with the each of the one or more accessible Uniform Resource Identifiers. The term "metadata" as used herein refers to data which provides information about one or more aspects of a data file (such as the fetched web content). Optionally, the metadata can include a hash of the contents of the data file, as well as additional data relating, for example, to a policy for handling the data file. Optionally, the additional data associated with the each of the one or more accessible Uniform Resource Identifiers comprises at least one of: name, status, time-stamp, project associated with a Uniform Resource Identifier. For example, an accessible URI may be "www.eoqi.com" that was successfully accessed to extract web content for researching a painkiller drug "H" at 7 pm on Dec. 1, 2018. In such instance, a name associated with the URI may be "www.eoqi.com", a status associated with the URI may be successful, a time-stamp associated with the URI may be 7 pm on Dec. 1, 2018, and a project associated with the URI may be research for a painkiller drug.

Optionally, the execution of the event further comprises storing the additional data in the data storage unit. Throughout the present disclosure, the term "data storage unit" relates to a programmable storage such as a programmable memory, having the ability to record multiple discrete bits of data, wherein discrete bits of data may be individually accessed after one or more recording operations. It will be appreciated that programmable means capable of storing unique data points, and addressable means having unique locations that may be selected for storing the unique data points. The web crawling model is operable to store the metadata related to the accessible URIs.

The system comprises a database arrangement communicably coupled to the data processing arrangement via the communication interface, wherein the database arrangement is operable to aggregate the contextual data into one or more database arranged therein. Throughout the present disclosure, the term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in a form of a table, a map, a grid, a packet, a datagram, a file, a document, a list or in any other form. The database arrangement includes any data storage software and/or systems, such as, for example, a relational database like IBM DB2 or Oracle 9. Furthermore, the database arrangement includes a software program for creating and managing one or more databases. Optionally, the database arrangement may be operable to support relational operations, regardless of whether it enforces strict adherence to a relational model, as understood by those of ordinary skill in the art. Additionally, the database arrangement is populated by the contextual data identified from the extracted web content. The database arrangement can include one or more database that may operate as storage repository therein. The term "data repository" relates to any device or combination of devices capable of storing the contextual data in a specific format. The contextual data is aggregated into one or more databases.

Furthermore, aggregating the contextual data relates to a process of organizing the contextual data in a specific data format that adheres to a specification of a specific database. Furthermore, the aggregation includes a number of functions that are performed on the contextual data. Optionally, the functions performed on the extracted web content include parsing, cleansing, normalizing, transforming, validating, formatting, and classifying data in the contextual data. Optionally, the aggregating the contextual data in one or more databases is based on the data structure associated with the contextual data. The contextual data is aggregated in a manner that the contextual data includes a data structure that adheres to a data structure of the database into which the contextual data is to be stored.

Furthermore, there is disclosed a computer readable medium, containing program instructions for execution on a computer system, which when executed by a computer, cause the computer to perform method steps for crawling a wide area computer network for retrieving contextual information. The method comprises the steps of receiving an input file, wherein the input file includes a plurality of Uniform Resource Identifiers, wherein each of the plurality of Uniform Resource Identifiers points to a corresponding web location in the wide area computer network, identifying, from the plurality of Uniform Resource Identifiers, accessible Uniform Resource Identifiers based on one or more parameters associated with each of the plurality of Uniform Resource Identifiers, obtaining one or more features associated with the accessible Uniform Resource Identifiers, executing an event for crawling the accessible Uniform Resource Identifiers to extract web content available in the corresponding web locations, wherein executing the event comprises creating at least one resource cluster for executing the event, wherein the at least one resource cluster comprises one or more resources acquired based on the one or more features associated with the accessible Uniform Resource Identifiers, acquiring at least one electronic record file to be executed by the at least one resource cluster, wherein acquiring at least one electronic record file is based on the one or more features associated with the accessible Uniform Resource Identifiers, and crawling the accessible Uniform Resource Identifiers using the at least one resource cluster, processing the extracted web content to identify contextual data, wherein the contextual data is organized into one or more data structure, and aggregating the contextual data.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated are steps of a method 100 of crawling a wide area computer network for retrieving contextual information in accordance with an embodiment of the present disclosure. At a step 102, an input file is received. Additionally, the input file includes a plurality of Uniform Resource Identifiers. Moreover, each of the plurality of Uniform resource Identifiers points to a corresponding web location in the wide area computer network. At a step 104, accessible Uniform Resource Identifiers are identified from the plurality of Uniform Resource Identifiers. Furthermore, the accessible Uniform Resource Identifiers are identified based on one or more parameters associated with each of the plurality of Uniform Resource Identifiers. At a step 106, one or more features associated with the accessible Uniform Resource Identifiers are obtained. At a step 108, an event for crawling the accessible Uniform Resource Identifiers to extract web content available in the corresponding web locations is executed. At a step 110, the extracted web content is processed to identify contextual data. Furthermore, the contextual data is organized into one or more data structure. At a step 112, the contextual data is aggregated.

The steps 102 to 112 are only illustrative and other alternatives can also be provided where one or more steps are added, one or more steps are removed, or one or more steps are provided in a different sequence without departing from the scope of the claims herein. In an example, the identifying the accessible Uniform Resource Identifiers includes fetching the one or more parameters associated with crawled Uniform Resource Identifiers from a data storage unit. Optionally, the identifying the accessible Uniform Resource Identifiers further includes analysing the one or more parameters associated with crawled Uniform Resource Identifiers with the one or more parameters associated with the plurality of Uniform Resource Identifiers. In an example, the one or more parameters associated with each of the plurality of Uniform Resource Identifiers and the crawled Uniform Resource Identifiers comprises at least one of: name, status, time-stamp, project associated with a Uniform Resource Identifier. Optionally, the one or more features associated with each of the one or more accessible Uniform Resource Identifiers comprises a type of the accessible Uniform Resource Identifiers, and traffic associated with the accessible Uniform Resource Identifiers. More optionally, the at least one electronic record file comprises one or more sets of instructions. In an example, the one or more sets of instructions is operable to perform at least one of an activity of extracting web content from the web location in the wide area computer network, an activity of processing the extracted web content to identify the contextual data. In an example, each of the one or more sets of instructions is a computing algorithm. In an example, the processing the extracted web content to identify the contextual data comprises generating an additional data associated with the each of the one or more accessible Uniform Resource Identifiers. Optionally, the additional data associated with the each of the one or more accessible Uniform Resource Identifiers comprises at least one of: name, status, time-stamp, project associated with a Uniform Resource Identifier. In an example, the method further comprises terminating the event for crawling, wherein terminating the event is based on a status of the event. Optionally, the aggregating the contextual data further comprises storing the contextual data in one or more databases arranged in a database arrangement. More optionally, the storing the contextual data in one or more databases is based on a data structure associated with the contextual data.

Figure 2:
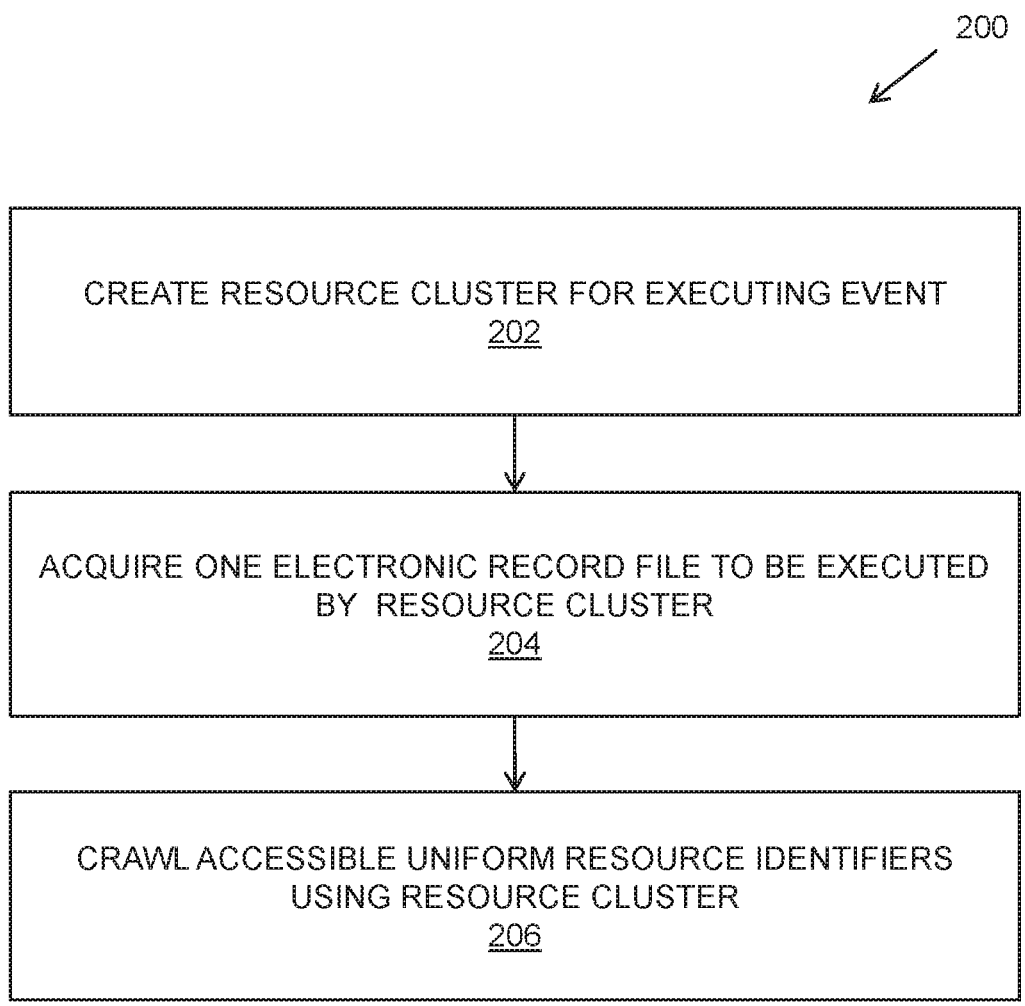
FIG. 2 is an illustration of steps of a method of executing an event for crawling the accessible Uniform Resource Identifiers to extract web content available in corresponding web locations, in accordance with an embodiment of the present disclosure.

Referring to FIG. 2, illustrated are steps of a method 200 of executing an event for crawling the accessible Uniform Resource Identifiers to extract web content available in corresponding web locations in accordance with an embodiment of the present disclosure. At a step 202, at least one resource cluster is created for executing the event. Furthermore, the at least one resource cluster comprises of one or more resources acquired based on the one or more features associated with the accessible Uniform Resource Identifiers. At a step 204, at least one electronic record file to be executed by the at least one resource cluster is acquired. Additionally, acquiring at least one electronic record file is based on the one or more features associated with the accessible Uniform Resource Identifiers. At a step 206, the accessible Uniform Resource Identifiers is crawled using the at least one resource cluster.

Figure 3:
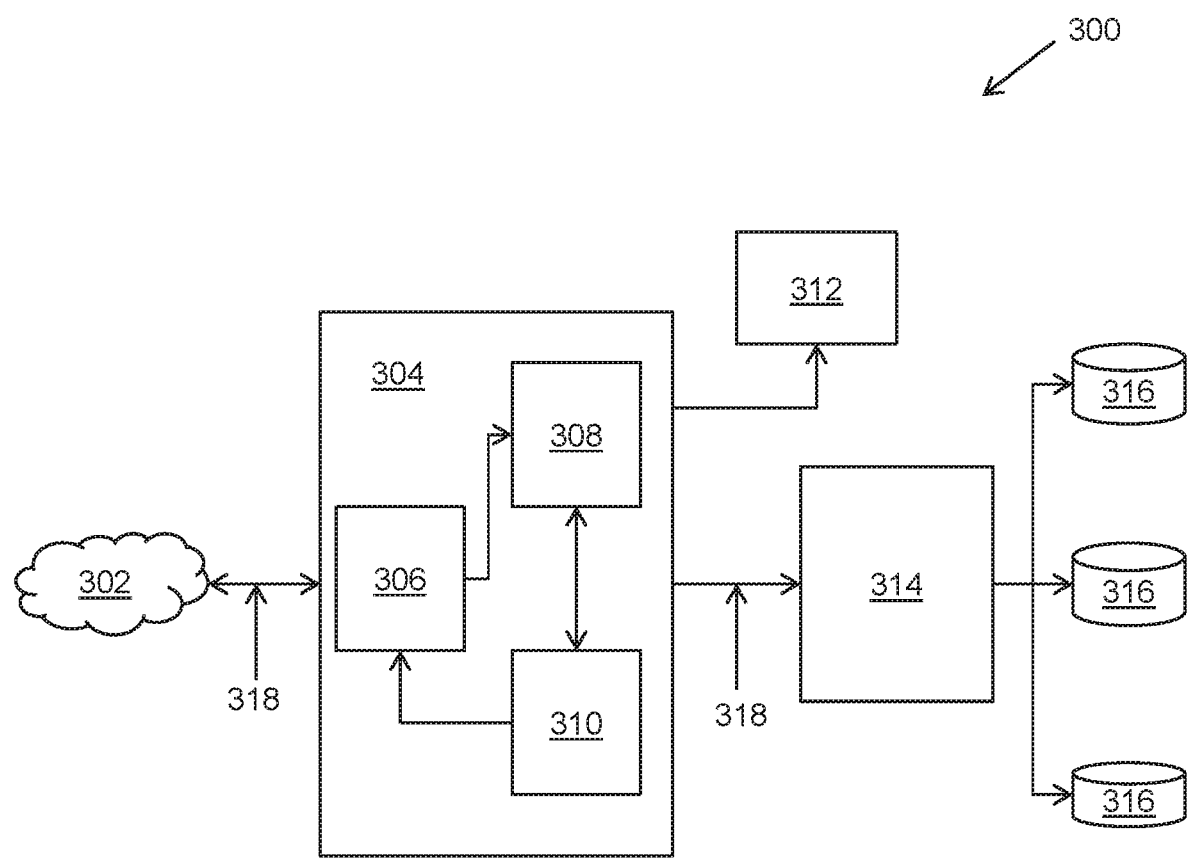
FIG. 3 there is shown a schematic illustration of a system that crawls a wide area computer network for retrieving contextual information, in accordance with an embodiment of the present disclosure.

Referring to FIG. 3, there is shown a schematic illustration of a system 300 that crawls a wide area computer network for retrieving contextual information, in accordance with an embodiment of the present disclosure. The system 300 comprises a Wide Area Computer Network 302 operable to provide a plurality of Uniform Resource Identifiers. The wide area computer network 302 is further communicably coupled to a data processing arrangement 304 operable to perform the function of crawling. The data processing arrangement 304 consists of an input user interface 306 which identifies plurality of accessible Uniform Resource Identifiers and provides it to a web crawling module 308. The web crawling module 308 performs the crawling function and is communicably coupled to a data storage unit 310 which stores additional data associated with each of the one or more previously crawled Uniform Resource Identifiers. The data processing arrangement 304 is further communicably coupled to a Git Repository 312 which provides electronic record files to the data processing arrangement 304. Additionally, the data processing arrangement 304 is coupled communicably to a database arrangement 314. The database arrangement 314 is further operable to store the contextual data in a one or more database arrangement 316. A communication interface 318 is further employed to access the wide area computer network and update information.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system that crawls a wide area computer network for retrieving contextual information, wherein the system includes a computer system, wherein the system comprises:
   a data processing arrangement comprising a processor, a communication interface for accessing the wide area computer network and a web crawling module, wherein the web crawling module, when executed by the processor, causes the processor to:
   receive an input file via a user interface provided by the data processing arrangement, wherein the input file includes a plurality of Uniform Resource Identifiers, wherein each of the plurality of Uniform Resource Identifiers points to a corresponding web location in the wide area computer network;
   identify, from the plurality of Uniform Resource Identifiers, accessible Uniform Resource Identifiers based on one or more parameters associated with each of the plurality of Uniform Resource Identifiers;
   obtain one or more features associated with the accessible Uniform Resource Identifiers, wherein the one or more features associated with each of the accessible Uniform Resource Identifiers comprise a type of an accessible Uniform Resource Identifier and traffic associated with the accessible Uniform Resource Identifiers, wherein the type of an accessible Uniform Resource Identifier includes static Uniform Resource Identifiers, dynamic Uniform Resource Identifiers, directory Uniform Resource Identifiers, categories of domain names associated with the accessible Uniform Resource Identifiers, and wherein the traffic associated with the accessible Uniform Resource Identifiers relates to an amount of data produced by the accessible Uniform Resource Identifiers; and
   execute an event for crawling the accessible Uniform Resource Identifiers to extract web content available in the corresponding web locations, wherein the event relates to a computing event triggered from one or more computing policies associated with hardware of the system, wherein executing the event comprises:
      creating at least one resource cluster for executing the event, wherein the at least one resource cluster comprises one or more resources acquired based on the obtained one or more features associated with the accessible Uniform Resource Identifiers, wherein the web crawling module is operable to use one or more logic or algorithms to determine a number of the one or more resources to be acquired to form the at least one resource cluster based on the obtained one or more features associated with the accessible Uniform Resource Identifiers;
      acquiring at least one electronic record file based on the obtained one or more features associated with the accessible Uniform Resource Identifiers, wherein acquiring the at least one electronic record file comprises fetching the at least one electronic record from an electronic record file repository, wherein the electronic record file repository is communicably coupled to the data processing arrangement via the communication interface, wherein the obtained one or more features associated with the accessible Uniform Resource Identifiers are analysed to determine a number of the electronic record files required for executing the event for crawling the accessible Uniform Resource Identifiers, using the one or more logic or algorithms in the web crawling module; and
      crawling the accessible Uniform Resource Identifiers using the created at least one resource cluster, wherein the created at least one resource cluster executes the acquired at least one electronic record file to crawl the accessible Uniform Resource Identifiers, wherein the at least one electronic record file fetched from the electronic record file repository is provided to the one or more resources of the created at least one resource cluster for executing the event, wherein the at least one resource cluster is operable to execute one or more sets of instructions included in the at least one electronic record file, wherein the one or more sets of instructions is operable to perform at least one of:

an activity of extracting web content from the corresponding web location in the wide area computer network;

an activity of processing the extracted web content to identify contextual data; and process the extracted web content to identify the contextual data, wherein the contextual data is organized into one or more data structures; and a database arrangement communicably coupled to the data processing arrangement via the communication interface, wherein the database arrangement is operable to aggregate the contextual data into one or more databases arranged therein.

2. The system of claim 1, wherein the data processing arrangement further includes a data storage unit, wherein the data storage unit is operable to store the one or more parameter associated with crawled Uniform Resource Identifiers, wherein the data storage unit comprises a physical entity which stores data that describes the parameters associated with crawled Uniform Resource Identifiers.

3. The system of claim 1, wherein identifying the accessible Uniform Resource Identifiers includes fetching the one or more parameters associated with the crawled Uniform Resource Identifiers from a data storage unit, wherein the data storage unit comprises a physical entity which stores data that describes the parameters associated with crawled Uniform Resource Identifiers.

4. The system of claim 1, wherein the one or more parameters associated with each of the plurality of Uniform Resource Identifiers and the crawled Uniform Resource Identifiers comprises at least one of: name, status, time-stamp, project associated with each Uniform Resource Identifiers.

5. The system of claim 1, wherein processing the extracted web content to identify the contextual data comprises generating an additional data associated with the each of the one or more accessible Uniform Resource Identifiers.

6. The system of claim 5, wherein the additional data associated with the each of the one or more accessible Uniform Resource Identifiers comprises at least one of: name, status, time-stamp, project associated with a Uniform Resource Identifier.

7. The system of claim 1, wherein the execution of the event further comprises storing the additional data in the data storage unit.

8. The system of claim 1, wherein the execution of the event further comprises terminating the event for crawling, wherein terminating the event is based on a status of the event.

9. The system of claim 1, wherein the aggregating the contextual data in one or more databases is based on the data structure associated with the contextual data.

10. A method of crawling a wide area computer network for retrieving contextual information, wherein the method includes using a computer system, wherein the method comprises:

receiving an input file, wherein the input file includes a plurality of Uniform Resource Identifiers, wherein each of the plurality of Uniform Resource Identifiers points to a corresponding web location in the wide area computer network;

identifying, from the plurality of Uniform Resource Identifiers, accessible Uniform Resource Identifiers based on one or more parameters associated with each of the plurality of Uniform Resource Identifiers;

obtaining one or more features associated with the accessible Uniform Resource Identifiers, wherein the one or more features associated with each of the accessible Uniform Resource Identifiers comprise a type of an accessible Uniform Resource Identifiers and traffic associated with the accessible Uniform Resource Identifiers, wherein the type of an accessible Uniform Resource Identifier includes static Uniform Resource Identifiers, dynamic Uniform Resource Identifiers, directory Uniform Resource Identifiers, categories of domain names associated with the accessible Uniform Resource Identifiers, and wherein the traffic associated with the accessible Uniform Resource Identifiers relates to an amount of data produced by the accessible Uniform Resource Identifiers;

executing an event for crawling the accessible Uniform Resource Identifiers to extract web content available in the corresponding web locations, wherein the event relates to computing event triggered from one or more computing policies associated with hardware included in the system, wherein executing the event comprises:

creating at least one resource cluster for executing the event, wherein the at least one resource cluster comprises one or more resources acquired based on the obtained one or more features associated with the accessible Uniform Resource Identifiers, wherein the web crawling module is operable to use one or more logic or algorithms to determine a number of one or more resources to be acquired to form the at least one resource cluster on the basis of the obtained one or more features associated with the accessible Uniform Resource Identifiers;

acquiring at least one electronic record file based on the obtained one or more features associated with the accessible Uniform Resource Identifiers, wherein acquiring the at least one electronic record file comprises fetching the at least one electronic record from an electronic record file repository, wherein the electronic record file repository is communicably coupled to the data processing arrangement via the communication interface, wherein the obtained one or more features associated with the accessible Uniform Resource Identifiers are analysed to determine a number of the electronic record files required for executing the event for crawling the accessible Uniform Resource Identifiers, using the one or more logic or algorithms in the web crawling module; and crawling the accessible Uniform Resource Identifiers using the created at least one resource cluster, wherein the created at least one resource cluster executes the acquired at least one electronic record to crawl the accessible Uniform Resource Identifiers, wherein the at least one electronic record file fetched from the electronic record file repository is provided to the one or more resources of the created at least one resource cluster for executing the event, wherein the at least one resource cluster is operable to execute one or more sets of instructions included in the at least one electronic record file, wherein the one or more sets of instructions is operable to perform at least one of:
an activity of extracting web content from the corresponding web location in the wide area computer network;
an activity of processing the extracted web content to identify contextual data;
processing the extracted web content to identify the contextual data, wherein the contextual data is organized into one or more data structure; and
aggregating the contextual data into one or more databases arranged in a database arrangement communicably coupled to a data processing arrangement via a communication interface.

11. The method of claim 10, wherein the identifying the accessible Uniform Resource Identifiers includes fetching the one or more parameters associated with crawled Uniform Resource Identifiers from a data storage unit.

12. The method of claim 10, wherein the one or more parameters associated with each of the plurality of Uniform Resource Identifiers and the crawled Uniform Resource Identifiers comprises at least one of: name, status, timestamp, project associated with a Uniform Resource Identifier.

13. A non-transitory computer readable storage medium, containing program instructions for execution on a computer system, which when executed by a computer, cause the computer to perform method steps for identifying at least one nascent topic related to a subject matter, the method comprising the steps of:
receiving an input file, wherein the input file includes a plurality of Uniform Resource Identifiers, wherein each of the plurality of Uniform Resource Identifiers points to a corresponding web location in the wide area computer network;
identifying, from the plurality of Uniform Resource Identifiers, accessible Uniform Resource Identifiers based on one or more parameters associated with each of the plurality of accessible Uniform Resource Identifiers;
obtaining one or more features associated with the accessible Uniform Resource Identifiers, wherein the one or more features associated with each of the accessible Uniform Resource Identifiers comprise a type of an accessible Uniform Resource Identifiers and traffic associated with the accessible Uniform Resource Identifiers wherein the type of an accessible Uniform Resource Identifier includes static Uniform Resource Identifiers, dynamic Uniform Resource Identifiers, directory Uniform Resource Identifiers, category of domain name associated with the accessible Uniform Resource Identifiers, and wherein the traffic associated with the accessible Uniform Resource Identifiers relates to amount of data produced by the accessible Uniform Resource Identifiers;
executing an event for crawling the accessible Uniform Resource Identifiers to extract web content available in the corresponding web locations, wherein the event relates to computing event triggered from one or more computing policies associated with hardware included in the system, wherein executing the event comprises:
creating at least one resource cluster for executing the event, wherein the at least one resource cluster comprises one or more resources acquired based on the obtained one or more features associated with the accessible Uniform Resource Identifiers, wherein the web crawling module is operable to use one or more logic or algorithms to determine a number of one or more resources to be acquired to form the at least one resource cluster on the basis of the obtained one or more features associated with the accessible Uniform Resource Identifiers;
acquiring at least one electronic record file based on the obtained one or more features associated with the accessible Uniform Resource Identifiers, wherein acquiring the at least one electronic record file comprises fetching the at least one electronic record from an electronic record file repository, wherein the electronic record file repository is communicably coupled to the data processing arrangement via the communication interface, wherein the obtained one or more features associated with the accessible Uniform Resource Identifiers are analysed to determine a number of the electronic record files required for executing the event for crawling the accessible Uniform Resource Identifiers, using the one or more logic or algorithms in the web crawling module; and
crawling the accessible Uniform Resource Identifiers using the created at least one resource cluster, wherein the created at least one resource cluster executes the acquired at least one electronic record to crawl the accessible Uniform Resource Identifiers, wherein the at least one electronic record file fetched from the electronic record file repository is provided to the one or more resources of the created at least one resource cluster for executing the event, wherein the at least one resource cluster is operable to execute one or more sets of instructions included in the at least one electronic record file, wherein the one or more sets of instructions is operable to perform at least one of:
an activity of extracting web content from the corresponding web location in the wide area computer network;
an activity of processing the extracted web content to identify contextual data;
processing the extracted web content to identify the contextual data, wherein the contextual data is organized into one or more data structure; and
aggregating the contextual data into one or more databases arranged in a database arrangement communicably coupled to a data processing arrangement via a communication interface.

* * * * *